July 7, 1925.  1,545,209
A. P. STECKEL
FLOW TUBE AND VALVE THEREFOR
Filed March 14, 1921  2 Sheets-Sheet 1
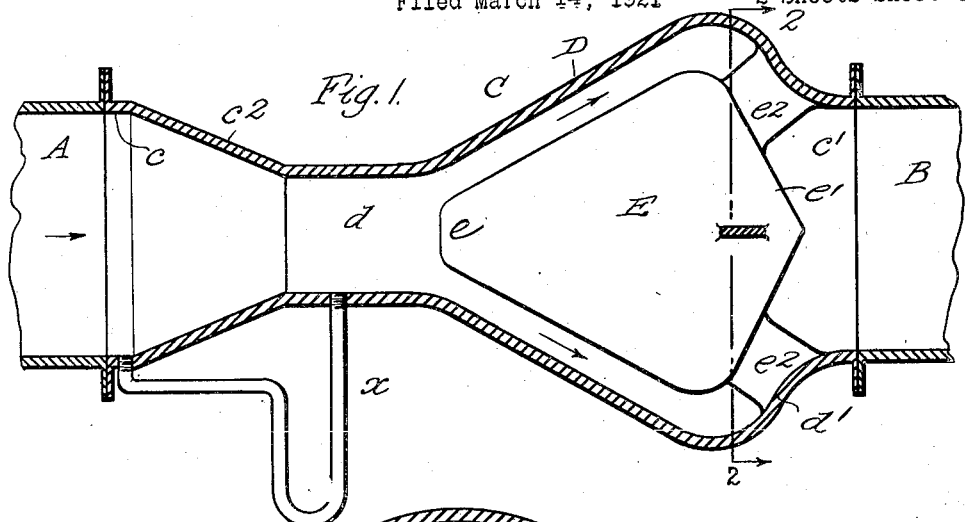
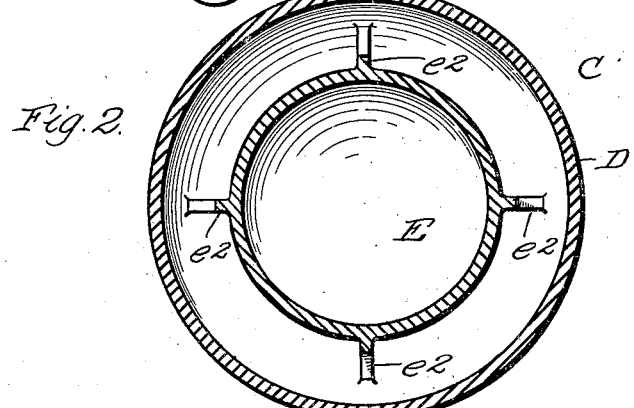
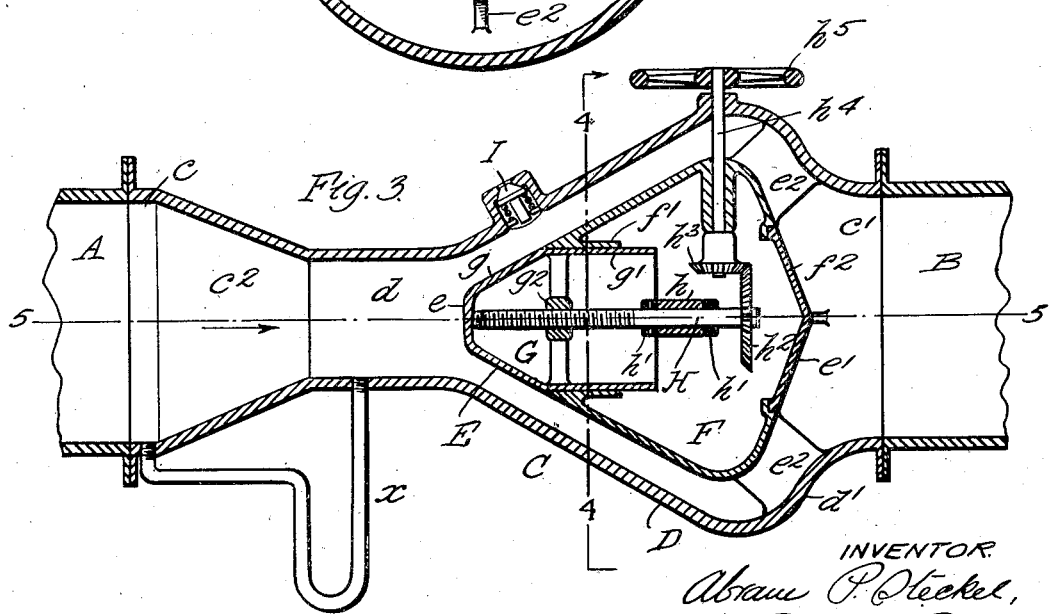
INVENTOR.
Abram P. Steckel,
by Parker & Brochwood.
ATTORNEYS.

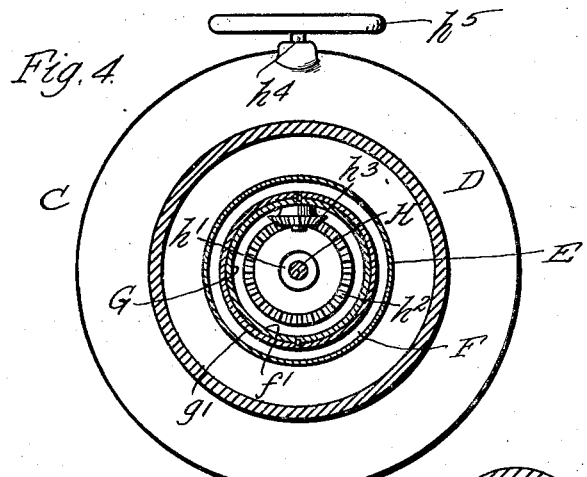
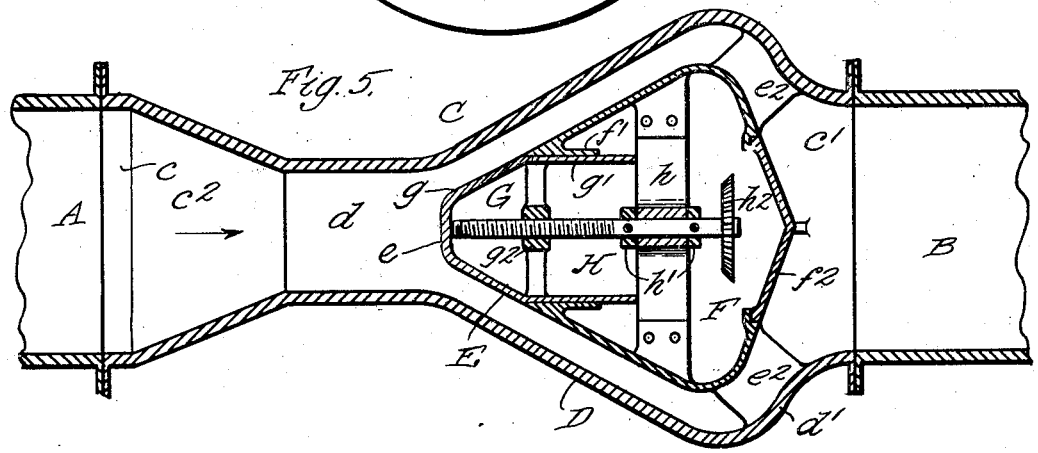
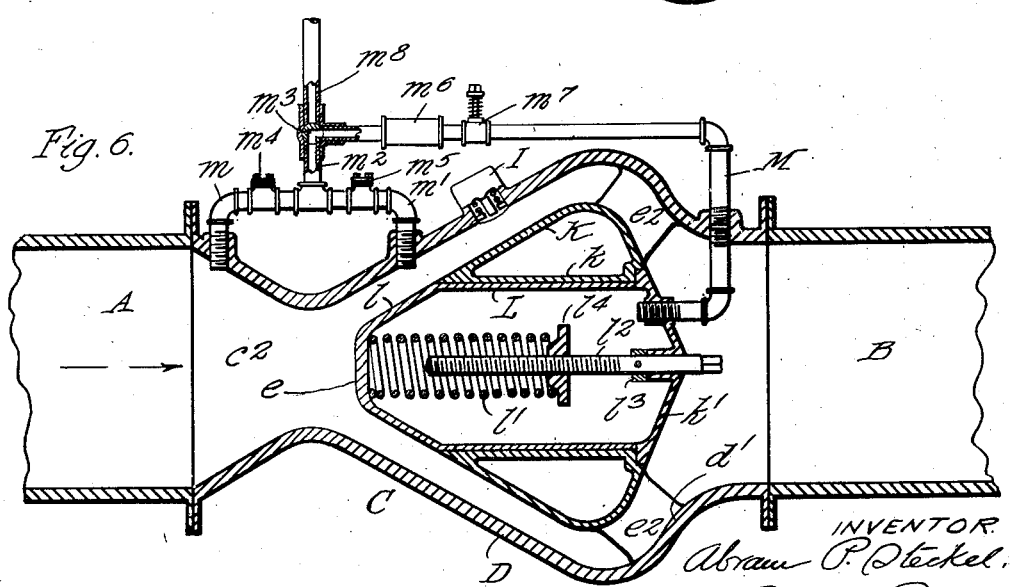

Patented July 7, 1925.

1,545,209

UNITED STATES PATENT OFFICE.

ABRAM P. STECKEL, OF YOUNGSTOWN, OHIO.

FLOW TUBE AND VALVE THEREFOR.

Application filed March 14, 1921. Serial No. 451,970.

*To all whom it may concern:*

Be it known that I, ABRAM P. STECKEL, citizen of the United States, residing at Youngstown, in the county of Mahoning and State of Ohio, have invented a new and useful Improvement in Flow Tubes and Valves Therefor, of which the following is a specification.

This invention relates to means for guiding and controlling the flow of fluids in conduits.

One of the objects of this invention is to provide a flow passage or tube for fluids, of improved construction, whereby the fluid can pass from a smaller to a larger conduit without involving an excessive loss of energy and without necessitating the use of a long, tapering tube such as commonly used. Another object of the invention is to combine with a flow passage of this kind, a valve of improved construction for interrupting or controlling the flow of fluid through a conduit, which valve can be built much more compactly, and consequently at less expense than was heretofore possible; also to provide a valve for interrupting the flow of fluids in a conduit which can be actuated by the pressure of the fluid in the conduit; also to improve the construction of flow passages and valves of this kind in other respects hereinafter specified.

In the accompanying drawings:

Fig. 1 is a longitudinal sectional elevation of a flow tube or passage embodying the invention.

Fig. 2 is a transverse sectional elevation thereof on line 2—2, Fig. 1.

Fig. 3 is a longitudinal sectional elevation of a flow tube having combined therewith a valve for interrupting the flow of fluids through the passage.

Fig. 4 is a transverse sectional elevation thereof on line 4—4, Fig. 3.

Fig. 5 is a longitudinal sectional plan view thereof on line 5—5, Fig. 3.

Fig. 6 is a longitudinal sectional elevation of a flow tube showing means for operating the controlling valve by the pressure of the fluid in the conduit or tube.

It is well known that if a fluid flows from a passage of greater diameter to one of lesser diameter, no material loss of energy occurs, but when a fluid flows from a passage of smaller diameter to one of greater diameter a very considerable loss of head occurs unless the increase in diameter is a very gradual one. In a Venturi tube, for example, the part of the tube through which the fluid flows from the restricted passage to the portion of greater area is in the form of a long, gradually tapering passage, which prevents the loss of energy of the fluid. This long, tapering passage requires a considerable length of straight pipe line for installation, especially if used on pipes of large diameter such as water mains, and this invention aims to eliminate the necessity for having a long, tapering tube of this kind and to replace the same by a comparatively short tube or passage, which reduces materially the difficulty of finding available space for installation in the crowded interior of pumping stations, etc.

The flow tubes shown in the drawings all connect with a pipe or conduit A from which the fluid enters the flow tube, and a tube or conduit B into which the fluid is discharged. The pipes A and B as shown in the drawings, are of the same size, but these tubes may be of different sizes if desired. C represents a flow tube embodying the invention which is provided with an inlet end $c$ of the same internal diameter as and connecting with the pipe A, and a outlet or discharge end $c'$ of the same internal diameter as the pipe B and connecting therewith. The flow tube is provided with a contracting portion $c^2$, which may be substantially frusto-conical in form, as shown, and which is arranged at the inlet portion of the flow tube, and which may, if desired, be substantially the same in its general shape and form as the contracting portion of the usual Venturi tube. The contracted portion or small end of the portion $c^2$ is connected with a diffusing portion or shell D which tapers oppositely from the contracting portion $c^2$, namely, increasing in diameter in the direction of flow, as indicated by the arrows. The diffusing portion of the flow tube may connect directly with the contracting portion $c^2$, as shown in Fig. 6, or may be connected therewith by means of a tube or passage $d$ as shown in Figs. 1, 3 and 5.

This diffusing portion of the tube expands very much more abruptly than the usual diffuser of a Venturi tube and has its largest diameter considerably greater than that of the pipe B. From the part of greatest diameter the diffuser shell is contracted as shown at $d'$ and terminates in the discharge portion $c'$ of the flow tube. In order to cause the fluid to flow efficiently through the abruptly expanding portion of the shell, an internal diffusing member E is provided within the diffuser shell D. This member cooperates with the diffuser shell to form a substantially conical passage through which the fluid passes, consequently if the diffuser shell D is frusto-conical in form, the internal diffusing member should also be frusto-conical or conical and should be substantially concentric with the shell. The internal member and shell are preferably so proportioned that the cross sectional area of the flow passage at the part of greatest diameter is substantially the same as the cross sectional area of the pipe B into which the fluid is discharged. The internal diffusing member E is preferably provided with a blunt front end $e$ and the rear end thereof may be formed in any desired manner, that shown terminating in a conical end $e'$. The internal member may be held in place by any desired means, for example, by ribs or arms $e^2$ connecting the shell D and the internal member.

A diffuser of this general type, though new in connection with valves, has been proposed before for use in hydraulic turbine draft tubes. However, upon actual test, it has given such poor efficiency that it has not been used, and devices of far less theoretical merit, but yielding higher efficiency in practice, have been used instead. I have discovered the reason for this failure and by applying remedies which form part of this invention, have obtained efficiency practically equal to that of the long, straight Venturi tube.

I have discovered that to realize this high efficiency the fluid must be directed into the expanding conical passage in such a way that each particle of fluid starts into the conical passage moving naturally along a conical element from which it is not deflected by containing walls until completely slowed down at the large end of the diffuser to the rate of flow desired in the discharge tube B. If this condition is realized, the containing conical walls, both inner and outer, have practically nothing to do with shaping or directing the hollow jet and all the deflection that there is depends principally on the diameter and only slightly on the shape of the point on the inner cone, as related to the diameter of the jet impinging on it. This means that so far as direction of each particle of fluid is concerned, there is a condition of free flow established by impingement on the point of inner cone in a manner fully discussed in United States Patent No. 1,223,843, but that patent applies only to the particular case of impingement on a plate of much greater area than the cross section of impinging jet.

I employ the principle set forth in Patent No. 1,223,843, that is, that change of direction of flow is attended with much less loss if accomplished by direct impingement on a deflecting surface than if accomplished by flow through a curving passageway. However, I use a surface of much less area than the area of the jet so as to get the small angle of deflection that I employ instead of the large surface as shown in Patent No. 1,223,843, which naturally limits the device there shown to deflection through 90 degrees. So great a deflection as 90 degrees not only increases the energy loss but limits the expansion possible within given dimensions to an amount far less than is obtainable with conical, hollow jets.

Since the ideal condition aimed at in designing the deflecting point is a condition of free flow along conical elements of any chosen conical angle, the effect of any size or shape of deflecting surface may be directly and easily observed by experiments with an open jet. Similarly, the proper contour of curved surface that joins together the throat portion with the outer conical diffuser shell can be found by observing the contour of the deflected, free jet at this region. I find that a flat point, as shown in the drawings, gives as good a result as can be obtained, and that crowning the point, or the addition of a needle point or any like modifications have no beneficial effect. The important improvement introduced by designing in accordance with the performance of a free jet is that the point is cut back farther making it larger in diameter than in models that were hitherto unsuccessful, and the low efficiency of which have prevented the use of this ideal form of diffuser.

Flow tubes of this kind may be used to recover velocity head wherever there is occasion for liquid to flow from a smaller to a larger tube, or to flow away from any hydraulic device into an open pool. For example, in Fig. 1, the flow tube is shown as used in connection with a Venturi meter, a gage for indicating differences in pressure being indicated diagrammatically at $x$ in Figs. 1 and 3.

I have found that it is possible to combine with the internal diffusing member a valve for controlling the flow of liquid through the flow tube, the valve cooperating with the restricted portion of the flow tube. Heretofore, when it was necessary to place a valve in a large pipe, the valve necessarily had to be of very large size and was consequently costly to install and considerable time was required to open or close the valve. By means of the construction shown, a very much smaller valve can be used, thus effecting a saving in expense and also making it possible to open and close the valve in less time. In the construction shown for this purpose in Figs. 3, 4 and 5, the inner diffusing member is made in two parts, a housing or body portion F and a movable valve member or part G, which forms the reduced end of the inner member and which is movable relatively to the housing into a position to seat on the reduced portion of the flow tube. The movable valve member is provided with an outer portion $g$, which when the valve is in its open position, forms with the outer surfaces of the housing, an inner diffusing member. The valve member G also has a guide portion $g'$ adapted to cooperate with a corresponding guide portion $f'$ on the valve housing. $f^2$ represents a closure for the valve housing. The movable valve member may be actuated by any suitable means to open or close the valve. In the construction shown for this purpose, the movable valve member is provided with an internally threaded part $g^2$ with which a threaded stem H engages, which is journalled in a bearing member $h$ secured on the housing member and which is held from endwise movement thereon by collars $h'$ $h'$. This bearing member is preferably removably secured in the valve housing to facilitate assembling of the parts of the valve, and this bar preferably also forms a stop for the valve to limit the rearward movement of the valve at a point where the valve is in a position in which its outer face $g$ is in proper relation to the housing F. The threaded shaft H may be turned in any suitable manner, for example, by means of gears $h^2$ $h^3$ secured respectively on the threaded stem and on a rod or shaft $h^4$ which is suitably journalled in the valve housing F and the diffuser shell of the flow tube. The shaft $h^4$ may be turned in any desired manner, for example, a hand wheel $h^5$. If desired, the valve described and a Venturi meter may be used in conjunction with each other as indicated in Fig. 3.

When a liquid is flowing in a long pipe line and the flow is suddenly stopped by the closing of a valve, there is bound to result a noisy and often dangerous water hammer which is the result of one or both of two causes, as follows. The too sudden arresting of the momentum of the liquid in the upstream side may set up a dangerously high momentary pressure, accompanied by noise, by an action like that of the hydraulic ram. I make provision against any such dangerous pressure by a device described later, and shown in Fig. 6. The other cause of water hammer is the vacuum formed in the down stream side of the valve if the valve closes more suddenly than water beyond the valve will stop. In that case, when the water returns to fill up the vacuum, an uncushioned blow results which often breaks a valve or pipe line. To provide against such uncushioned blow I provide a check valve I in the down stream side of the valve which opens inwardly to admit air, both to prevent the formation of a vacuum which might cause water to return, and to provide an air cushion to break the blow if the water does return.

When it is not desired to use a Venturi meter in connection with a valve, the contracting portion of the flow passage can be made much more abrupt, as shown in Fig. 6, which makes it possible to reduce the length of the flow tube to a still greater extent than in the constructions shown in Figs. 1–5.

In Fig. 6 a valve is shown which may be operated by means of the pressure of the fluid in the flow tube. In this construction the inner diffusing member consists of a housing or guide portion K, suitably secured to the shell of the flow tube and having a cylindrical guide portion $k$ in which a movable plunger or valve member L is slidably mounted. The outer end $l$ of the valve member forms substantially a continuation of the valve housing K, these two parts, together forming the diffusing member. The portion $l$ of the plunger or valve member is made slightly more pointed than the diffusing portion of the shell of the flow tube, so that when the valve member is in its closed position it will contact along an edge of the neck portion of the flow tube. Although the diffusing passageway is shown as of even width in all the figures, the passageway may be widened toward the discharge end, the limiting taper being a very small angle. The valve or plunger when in its open position engages a head $k'$ which is preferably removable to afford access to the cylinder $k$ and is adapted to form a tight joint or seal with the plunger L when the same is in its inner position if packing is not used to seal the fit of the plunger. The plunger L is normally pressed outwardly by means of a spring $l'$, which, however, exerts only sufficient pressure to overcome any friction which may resist movement of the plunger out of the cylinder. The pressure exerted by the spring $l'$ on the plunger may be regulated by means of a threaded stem $l^2$ extending through the head $k'$ and held against movement through the head by means of a collar or sleeve $l^3$. This stem has a threaded engagement with a spring-engaging member $l^4$, so that by turning the stem $l^2$, the pressure exerted by the spring upon the plunger may be varied as desired.

The plunger may be moved outwardly into the valve-closing position by means of spring tension and fluid pressure introduced into the cylinder by a pipe M, as explained in detail later. This pipe is adapted to receive pressure from either one of the two branch pipes $m$ $m'$, connecting respectively with the contracting portion of the flow tube and with the diffusing portion thereof. These branch pipes connect with a pipe $m^2$ which adapted to be connected with the pipe M by means of a three-way valve $m^3$. The branch pipe $m$ is provided with a check valve $m^4$ which permits fluid to flow from the branch pipe $m$ toward the pipe $m^2$ and which prevents the flow of fluid in the opposite direction. The branch pipe $m'$ is provided with a check valve $m^5$ which permits fluid to flow from this branch pipe to the pipe $m^2$ and prevents the flow of fluid in the reverse direction. Consequently, when the valve $m^3$ is turned into the position to connect the pipe $m^2$ with the pipe M, the pipe M will receive fluid under pressure from either the pipe $m$ or $m'$, depending upon which pipe receives the greater pressure. It would not be necessary to provide the pressure pipe $m'$ if the valve had only to close or stay closed against pressure on the entering side. However, there may be occasions when the valve must close or stay closed when there is a severe flow or tendency to severe flow when the valve is closed. Without the connection $m'$ the valve would not stay closed against a pressure greater in the pipe B than in the pipe A if the difference applied to the annular area of the valve exposed to pressure in B were sufficient to overcome the spring. By providing the pipe $m'$, the higher pressure, whether on the side A or B, can be automatically available for application to the whole area of the plunger so that closing and staying closed are positive against normal flow or reverse flow. $m^6$ represents a strainer which may be used, if desired, and $m^7$ represents a safety valve of any usual or suitable type which will permit the escape of the fluid from the pipe M in case the pressure of the fluid in the pipe M becomes excessive for reasons given later. $m^8$ represents a drain pipe which may be connected with the pipe M by means of the valve $m^3$.

In the operation of this valve-closing mechanism if the fluid is flowing to the right in Fig. 6, and the valve $m^3$ is turned into a position to move the plunger valve L into its closing position, by connecting the pipe $m^2$ with the pipe M, the branch pipe $m$ will permit fluid to pass into the pipe M and thus exert a pressure on the plunger valve L, tending to move it toward its seat in the contracted throat portion of the flow tube. The pressure of the fluid in the throat portion of the flow tube being less than at the part thereof with which the branch pipe $m$ connects, the plunger valve will be readily moved into its closed position by the combined action of the spring $l'$ and the fluid admitted by the pipe M. Owing to the fact that the peripheral portion $l$ of the plunger valve seats only at the throat portion of the flow tube, while the valve itself is of considerably greater diameter than the throat portion, the pressure tending to seat the plunger valve L acts upon the greater area than the pressure in the neck portion of the flow tube, which tends to unseat the valve. Consequently, the valve will remain seated even after the flow of liquid has been stopped. The function of the safety valve $m^7$ is to automatically retard the rate of closing of the valve so as to prevent the valve from closing fast enough to cause too great a rise of pressure in a long pipe line on the entering side. The safety valve sets a limit to the pressure that can be applied back of the plunger and so sets a corresponding limit to the pressure that can be built up in the line to the left due to too rapid closing. If it is desired to again open the plunger valve, the three-way valve $m^3$ is turned into a position in which the pipe M is connected with the discharge or drain pipe $m^8$ with the result that the fluid acting on the plunger valve L is discharged because the pressure acting on the face $l$ of the plunger valve L will force the plunger valve back into its open position, the spring tension being easily overcome by the full line pressure in the plunger.

I claim as my invention:

1. In a pipe line for carrying fluids, a flow tube for obtaining contraction of area and consequent efficient enlargement of area within minimum length of tube, characterized by a contracted entrance throat and hollow conical diffusing portion containing an internal conical diffusing member concentrically arranged in said portion.

2. A flow tube according to claim 1 characterized in that the internal diffusing member has a blunt point facing the flow of fluid.

3. A flow tube according to claim 1 characterized in that the stream lines within the diffusing portion are straight.

4. A flow tube according to claim 1 characterized in that the stream lines within the diffusing portion are straight and the internal diffusing member has a blunt point facing the flow of fluid.

5. A flow tube according to claim 1 characterized in that a valve for closing off the flow in the pipe line forms a part of said internal diffusing member.

6. In a pipe line a plunger valve for controlling the flow of fluid in said pipe line actuated directly by pressure of the fluid in the pipe line, a passage connecting said pipe line with said plunger valve and a safety valve in said passage for limiting the pressure transmitted to said plunger.

7. A flow tube having a contracted entrance throat portion, a diffusing portion the diameter of which increases in the direction of flow of the fluid, an inner diffusing member arranged in said diffusing portion and spaced therefrom to form therewith an annular tapering diffusing passage, the middle part of said diffusing member being movable toward and from said throat portion and forming a plunger guide in the other part of said inner diffusing member, means for conducting fluid from said tube to said plunger to actuate the same, and a safety valve which prevents the transmission of excessive pressure to said plunger.

8. A flow tube having a contracted entrance throat portion, a valve adapted to close said tube at said throat portion, a plunger connected with said valve, a pipe having branches connecting with said tube at opposite sides of said throat portion and connected with said plunger, and check valves in said branches which permit fluid in said branches to flow only toward said plunger, whereby said valve may be closed by any pressure in said tube.

9. A flow tube having a contracted entrance throat portion, a valve adapted to close said tube at said throat portion and arranged within said tube and movable against the flow of fluid into its closing position, a plunger connected with said valve, a pipe having branches connecting with said tube at opposite sides of said throat portion and connecting with said plunger, and check valves in said branches which permit fluid in said branches to flow only toward said plunger, whereby said valve may be closed by any pressure in said tube.

10. A flow tube having a contracted entrance throat portion, a valve adapted to close said tube at said throat portion, a plunger connected with said valve, a pipe having branches connecting with said tube at opposite sides of said throat portion and connecting with said plunger, check valves in said branches which permit fluid in said branches to flow only toward said plunger, whereby said valve may be closed by any pressure in said tube, and a safety valve arranged to limit the pressure acting on said plunger.

11. A flow tube having a contracted entrance throat portion, a valve adapted to close said tube at said throat portion, a plunger connected with said valve, a pipe having branches connecting with said tube at opposite sides of said throat portion and connecting with said plunger, check valves in said branches which permit fluid in said branches to flow only toward said plunger, whereby said valve may be closed by any pressure in said tube, and a controlling valve in said pipe which may be turned into a position to permit fluid to pass into said plunger to move the same into a closing position and which may discharge the fluid from said plunger to permit the same to return to its open position.

12. A flow tube having a contracted entrance throat portion, a valve adapted to close said tube at said throat portion, a plunger connected with said valve, a pipe having branches connecting with said tube at opposite sides of said throat portion and connecting with said plunger, check valves in said branches which permit fluid in said branches to flow only toward said plunger, whereby said valve may be closed by the pressure in said tube, and a spring which acts on said valve in a direction to close the same.

ABRAM P. STECKEL.